E. H. ANGLE.
DENTAL TOOTH REGULATING APPLIANCE.
APPLICATION FILED JUNE 1, 1910. RENEWED AUG. 18, 1911.
1,014,029.
Patented Jan. 9, 1912.
Fig. I.
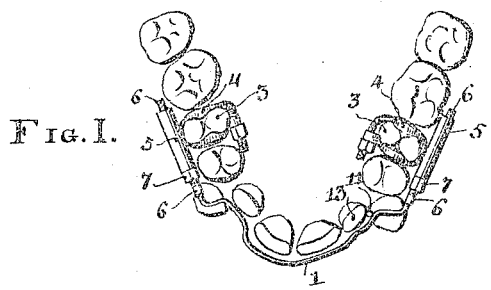
Fig. II.
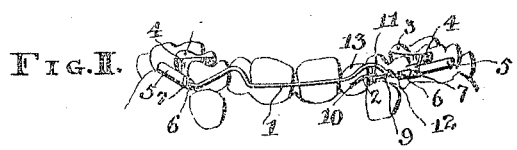
Fig. III.
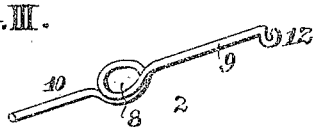
Fig. IV.
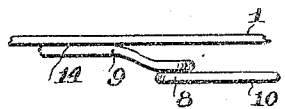
Fig. V.
Fig. VI.
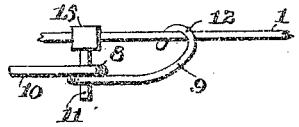
Fig. VIII.
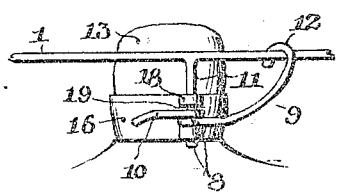
Fig. VII.
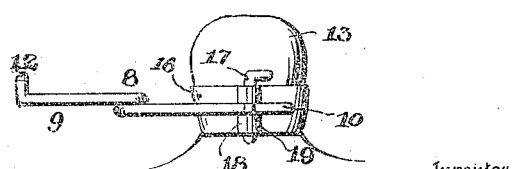

UNITED STATES PATENT OFFICE.

EDWARD H. ANGLE, OF NEW LONDON, CONNECTICUT.

DENTAL TOOTH-REGULATING APPLIANCE.

1,014,029.  Specification of Letters Patent.  Patented Jan. 9, 1912.

Application filed June 1, 1910, Serial No. 564,348. Renewed August 18, 1911. Serial No. 644,891.

*To all whom it may concern:*

Be it known that I, EDWARD H. ANGLE, a citizen of the United States, residing at New London, in the county of New London and State of Connecticut, have invented a certain new and useful Improvement in Dental Tooth-Regulating Appliances; and I do hereby declare the following to be a full, clear, and exact description of the invention, such as will enable others skilled in the art to which it appertains to make and use the same.

My invention relates to an improvement in orthodontia or dental tooth regulating appliances of the class comprising an elastic arch-bar and means for securing said arch-bar to the teeth in the human mouth.

The object of my invention is to provide a dental regulating arch-bar having connected therewith a torsion device for applying rotative and other pressure to malposed teeth.

To this end the invention consists of the appliance indicated in the accompanying drawings, described in the following specification and pointed out in the claims at the conclusion thereof.

In said drawings Figure I is a plan view of an arch-bar to which my invention is applied shown as mounted upon a human dental arch. Fig. II is a front view thereof. Fig. III is a perspective view on an enlarged scale of one form of my improved torsion device detached from the arch-bar. Fig. IV is a view in side elevation showing another form of torsion device. Figs. V and VI are similar views of other forms of torsion devices. Fig. VII is a view indicating one method of applying the torsion device to a malposed tooth, and Fig. VIII a view indicating another method of applying said device to said tooth.

My improved appliance comprises a curved or bowed arch-bar 1 and a torsion device 2 connected therewith. While any suitable arch-bar may be used in connection with my torsion device, I prefer that it, or at least its middle section 1, be a very delicate spring, such as iridio-platinum wire of small diameter, having little resiliency and capable of exerting but slight pressure when under tension. Means are provided for securing the arch-bar to anchor or abutment teeth—the molar teeth 3 usually being used for this purpose. As indicated in Fig. I, these means may consist of the well-known anchor bands 4, anchor tubes 5, externally threaded end sections 6 of the arch-bar, and adjusting nuts 7. Other means may be employed if desired.

The torsion device 2 (see Fig. III) consists essentially of a coil 8 having two members or extensions, one of which 9 is connected to the middle segment 1 of the arch-bar, and the other member 10 of which forms an arm or finger adapted to bear upon a malposed tooth for applying rotative pressure thereto.

The preferred form of torsion device indicated in Figs. II and III has detachable connection with the arch-bar, the coil 8 of the torsion device fitting upon a post or spur 11 projecting from the arch-bar. The member 9 is formed into a hook 12 which engages the arch-bar, the other member or arm 10 bearing upon the malposed tooth 13.

The form of torsion device indicated in Fig. IV is fixedly secured to the arch-bar, the member 9 in this instance being rigidly attached to said arch-bar as by solder, at 14. In this form of torsion device the coil 8 is not fitted on the post or spur of the arch-bar.

Still another form of torsion device is indicated in Fig. V. In this form instead of the coil 8 being detachably secured to a spur or post of the arch-bar as in the preferred form, or the member 9 fixedly secured directly to said arch-bar as in Fig. IV, said member 9 is fixedly secured to a ring or slide 15 fitted upon said arch-bar; or said ring 15 may have a spur or post 11 projecting from it and upon which the coil 8 may be fitted as in the preferred form.— See Fig. VI.

The finger or arm 10 of the torsion device may bear directly upon the malposed tooth 13 as indicated in Fig. II. It is better, however, to have said finger bear upon a band 16 surrounding and firmly secured to said tooth.—See Fig. VII. This figure also indicates a simple means for holding said finger in place upon the tooth, or rather upon the band surrounding the same.—A pin or section of wire 17 is inserted in a tube 18 on the band and cut away at 19, and the finger 10 passes under the exposed portion of the pin 17 and is thus held from slipping off the tooth. A similar result may be attained by inserting the coil 8 of the torsion device in the cut away portion 19 of the band tube 18 and then inserting the post or spur 11 of the arch-bar through said tube and coil.—See Fig. VIII. The torsion device is thus securely held in position with the finger 10 bearing upon the band 16.

In the operation of my improved appliance the arch-bar is mounted upon the natural teeth in the usual manner, the regulating nut 7 in this instance, however, being used more for adjusting the arch-bar to position than for regulating the malposed tooth, since the restoration of this tooth to its proper position in the dental arch is to be accomplished chiefly by the torsion device. After the arch-bar is properly mounted and adjusted the arm or finger 10 of the torsion device is brought to bear upon the malposed tooth, or upon the band surrounding the same, as before explained. With the appliance properly adjusted and placed under tension, the torsion device will exert pressure upon the malposed tooth to move it in the desired direction.

While the chief function of the device is to effect the rotation of a tooth, it will be readily perceived that the appliance may also be used for moving a tooth in a direct line. It must also be understood that several teeth may be acted upon at the same time as many torsion devices as may be necessary being connected to the arch-bar and applied one to each of the malposed teeth.

With an arch-bar provided with one or more of my improved torsion devices a constant, continuous and gentle force for rotation, and also for direct movement, may be exerted upon a malposed tooth or teeth and this force effectually maintained for weeks without attention. Because of its delicacy, compactness, and its close adaptation to the teeth, it will be practically out of the way, it will be inconspicuous and of no realizable inconvenience to the patient. In other words, it is characterized by extreme simplicity of construction and operation on the one hand and painless effectiveness on the other hand.

Coiled springs have heretofore been used in orthodontia for accomplishing tooth rotation and other tooth movements, but so far as I am aware, I am the first to use such a spring in connection with an arch-bar. Not only does the arch-bar afford superior support or bearing for the torsion device, but it also enables said device to be better controlled, the spring of said arch and that of the spur to which the torsion device is connected actually assisting in the tooth movement. The arch-bar may be bent to conform to the irregularities of the dental arch, as indicated for instance in Fig. I, this bending of the arch-bar also serving to increase tension on the appliance.

I claim as my invention:—

1. In a tooth regulating appliance the combination of an arch-bar, means for connecting said arch-bar to anchor teeth a coiled spring torsion device for applying pressure to a malposed tooth, said torsion device being connected to said arch-bar.

2. In a tooth regulating appliance the combination of an arch-bar, means for connecting said arch-bar to anchor teeth, and a coiled spring torsion device having detachable connection with said arch-bar.

3. A tooth regulating device consisting of an arm or finger adapted to bear upon a malposed tooth for applying pressure thereto, a coiled spring for imparting rotative force to said arm or finger, and means for connecting said device to an arch-bar.

4. A tooth regulating device consisting of a coiled spring adapted to fit upon a spur projecting from an arch-bar having one end extended into an arm or finger for bearing upon and applying force to a malposed tooth and the other end formed into a hook for engaging said arch-bar.

5. In a tooth regulating appliance the combination of an arch-bar, means for connecting said arch-bar to anchor teeth, and a coiled spring torsion device having sliding connection with said arch-bar.

6. In a tooth regulating appliance the combination of an arch-bar, a spur projecting therefrom, means for connecting said arch-bar to anchor teeth, a torsion device adapted to be fitted upon said spur and having means for applying force to a malposed tooth.

7. In a tooth regulating appliance the combination of a resilient arch-bar and a coiled spring torsion device connected therewith.

In testimony whereof I have fixed my signature in the presence of two witnesses.

EDWARD H. ANGLE.

Witnesses:
JAMES H. CASSIDY,
NATHAN BELCHER.